(12) United States Patent
Eby et al.

(10) Patent No.: US 6,493,777 B1
(45) Date of Patent: Dec. 10, 2002

(54) METHOD FOR DYNAMICALLY RECONFIGURING DATA BUS CONTROL

(75) Inventors: Paula M. Eby, Hoptacong, NJ (US); Keith E. Strege, Branchburg Township, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/396,938

(22) Filed: Sep. 15, 1999

(51) Int. Cl.[7] .............................................. G06F 13/00
(52) U.S. Cl. ..................................................... 710/110
(58) Field of Search .......................... 710/8, 9, 10, 14, 710/110; 713/100; 709/208, 209, 220, 221, 222; 714/3, 48

(56) References Cited

U.S. PATENT DOCUMENTS

| | | | | |
|---|---|---|---|---|
| 4,209,838 A | * | 6/1980 | Alcorn et al. | 710/119 |
| 5,285,443 A | * | 2/1994 | Patsiokas et al. | 370/280 |
| 5,434,865 A | * | 7/1995 | Kirkham | 370/401 |
| 5,463,733 A | * | 10/1995 | Forman et al. | 710/241 |
| 5,551,066 A | * | 8/1996 | Stillman et al. | 370/400 |
| 5,774,786 A | * | 6/1998 | Wirtjes et al. | 370/226 |
| 5,919,266 A | * | 7/1999 | Sud et al. | 714/13 |
| 5,936,949 A | * | 8/1999 | Pasternak et al. | 370/310.1 |
| 6,006,259 A | * | 12/1999 | Adelman et al. | 709/223 |
| 6,018,795 A | * | 1/2000 | Boudou et al. | 709/208 |
| 6,052,795 A | * | 4/2000 | Murotani et al. | 714/3 |
| 6,061,600 A | * | 5/2000 | Ying | 700/3 |
| 6,073,249 A | * | 6/2000 | Watabe et al. | 714/4 |

* cited by examiner

Primary Examiner—Xuan M. Thai
(74) Attorney, Agent, or Firm—Harness, Dickey & Pierce, P.L.C.

(57) ABSTRACT

A method for dynamically reconfiguring control of a data bus when an initial device acting as a bus master fails or become inoperative. Each device connected to the data bus checks for the logical address of either its next higher or next lower neighbor; and the initial device acting as bus master is arbitrarily assigned the highest or lowest available logical address respectively. In either instance, the logically next lower or logically next higher device, respectively, may see a device at a logical address that is lower or higher than its own, thereby indicating that the initial device acting as bus master has become inoperative. Thereafter, the next available device able to act as bus master promotes itself to act as bus master, including reassigning itself to the highest or lowest available logical address, respectively.

24 Claims, 5 Drawing Sheets

FIG. 3

| OFFSET | F | 1E | 1D | 1C | 1B | 1A | 19 | 18 | 17 | 16 | 15 | 14 | 13 | 12 | 11 | 10 | F | E | D | C | B | A | 9 | 8 | 7 | 6 | 5 | 4 | 3 | 2 | 1 | 0 | OFFSET | IDs (HEX) |
|---|---|---|---|---|---|---|---|---|---|---|---|---|---|---|---|---|---|---|---|---|---|---|---|---|---|---|---|---|---|---|---|---|---|---|
| | RADIOS | | | | | | | | | | | | | | | | | | | | | | | | | | RESERVED | | | | | | 00 - 1F | ← BROADCAST |
| | AMPLIFIERS | | | | | | | | | | | | | | | CLOCKS | | | | | | | RADIOS (CONT.) | | | | | | | | | 20 - 3F | |
| | RESERVED | | | | | | | | | | | | | | | | AMPLIFIERS (CONT.) | | | | | | | | | | | | | | | 40 - 5F | |
| | RESERVED | | | | | | | | | | | | | | | | | | | | | | | | | | | | | | | | 60 - 7F | |
| | RESERVED | | | | | | | | | | | | | | | | | | | | | | | | | | | | | | | | 80 - 9F | |
| | RESERVED | | | | | | | | | | | | | | | | | | | | | | | | | | | | | | | | A0 - BF | |
| | EXTERNAL EQUIPMENT | | | | | | | | | | | | | | | | | | RESERVED | | | | | | | | | | | | | | C0 - DF | |
| | CONTROLLERS | | | | | | | | | | | | | | | | | | | | | | | | | TEST EQUIPMENT | | | | | | | E0 - FF | |
| OFFSET | F | 1E | 1D | 1C | 1B | 1A | 19 | 18 | 17 | 16 | 15 | 14 | 13 | 12 | 11 | 10 | F | E | D | C | B | A | 9 | 8 | 7 | 6 | 5 | 4 | 3 | 2 | 1 | 0 | OFFSET | |

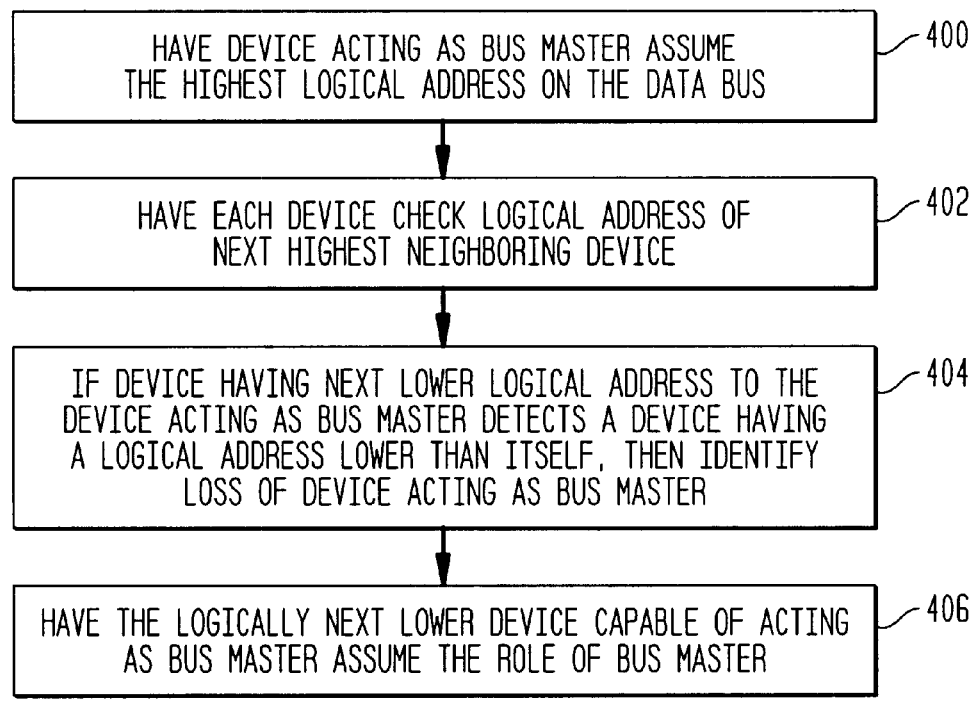
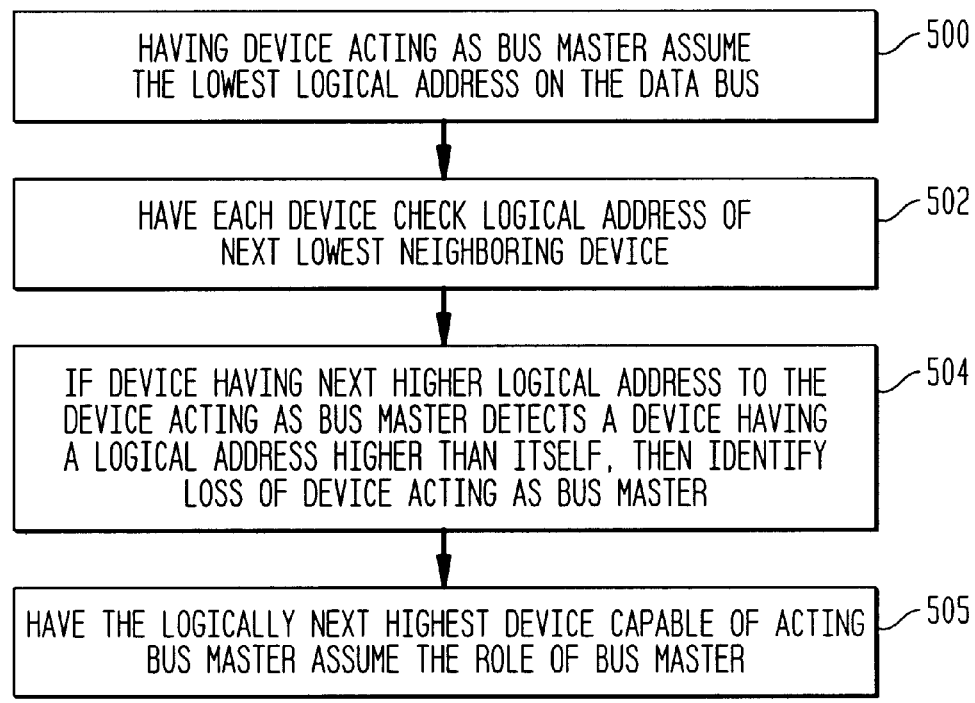

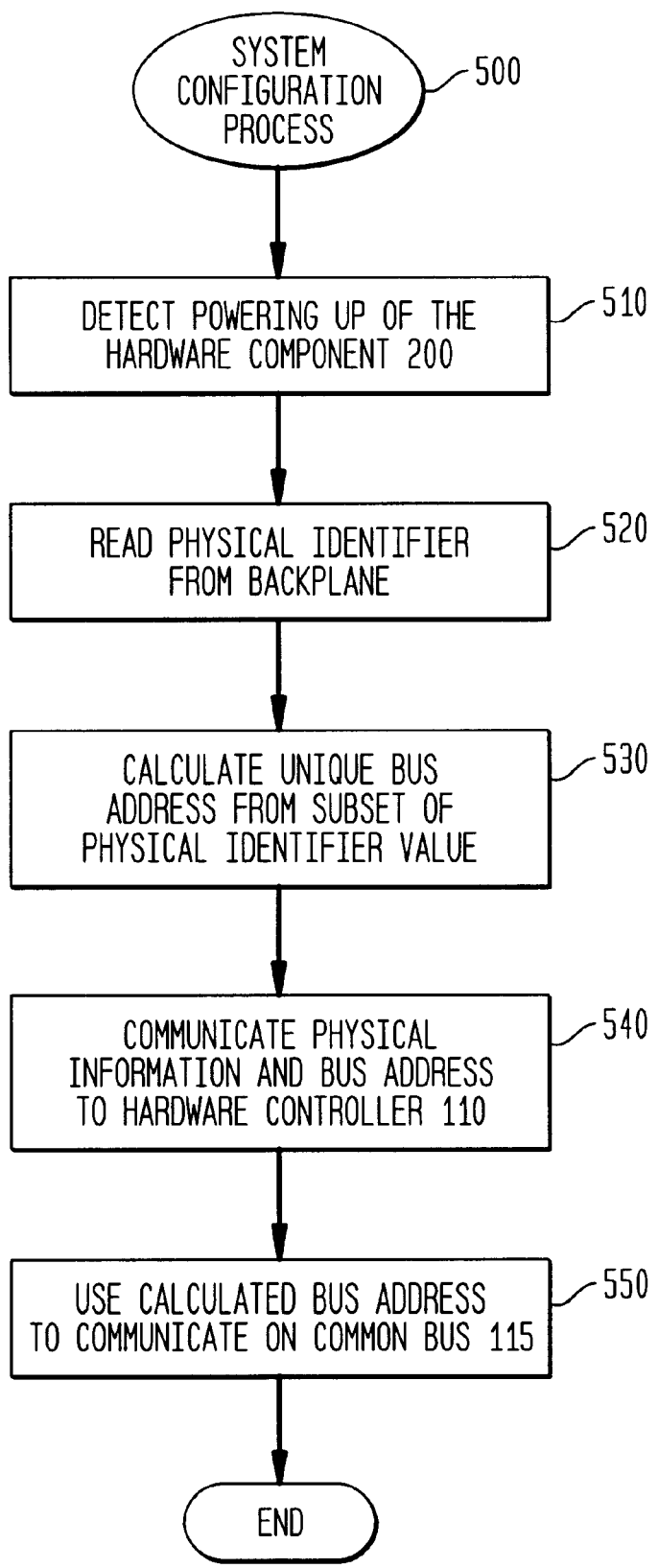

METHOD FOR DYNAMICALLY RECONFIGURING DATA BUS CONTROL

CROSS-REFERENCE TO RELATED APPLICATIONS

The present invention is related to co-pending U.S. patent application Ser. Nos. 09/198,289 and 09/198,098 both filed on Nov. 23, 1998 and entitled "A Method and Apparatus for Determining an Address Uniquely Identifying a Hardware Component on a Common Bus," and "A Method and Apparatus for Dynamically Determining an Address Uniquely Identifying a Hardware Component on a Common Bus," respectively.

SUMMARY OF THE INVENTION

The present invention relates to a method for dynamically reconfiguring data bus control by transferring the role of bus master between devices connected to the data bus, and more particularly relates to a data bus used in cell stations in a cellular telephone system.

BACKGROUND OF THE INVENTION

Generally, a known cellular telephone system includes a central station and one or more cell stations. The cell stations are generally remote from the central station, and are usually distributed throughout a cellular telephone service area. The cellular telephone system may, for example, connect a cellular telephone user to the Public Switched Standard Network ("the PSTN") via one or more of the cell stations and the central station.

Cell stations are conventionally provided with various hardware components (sometimes called "circuit packs") to provide required functionality. These components may include, for example, controllers, clock boards, radios, and amplifiers.

Conventionally, a hardware controller, also provided in the cell station, controls the circuit packs in the cell station. The hardware controller and the circuit packs communicate with each other on a common data bus. Accordingly, the hardware controller acts as a bus master to ensure that all circuit packs have a chance to transmit and receive data from the data bus. In the conventional art, such a hardware controller has no function other than its bus master function. Accordingly, at minimum, it takes up space within a cell station. Since cell station miniaturization is desirable, the loss of usable space is a problem.

In addition, if the hardware controller fails, the unit must be replaced by a technician, causing undesirable down time for the cell station and call processing disruption.

SUMMARY OF THE INVENTION

Most generally, the present invention provides a method for dynamically reconfiguring control of a data bus.

In particular, according to the present invention, bus master functionality is provided by one or more types of the circuit packs that are already conventionally used in a cell station, whereby the use of a separate hardware controller is avoided. Moreover, the method according to the present invention recognizes when a circuit pack (which initially provides bus master functionality) becomes inoperative and effectively invisible to the data bus. Thereafter, data bus control is dynamically controlled so that another one of the circuit packs that can act as the bus master promotes itself to having bus master functionality. In this manner, the data bus is "self-healing," so cell station downtime is avoided or at least reduced.

More specifically, each of the circuit packs periodically checks the logical addresses of their logical neighbors, especially the next highest logical address of a neighboring circuit pack. The circuit pack currently exercising bus master functionality is arbitrarily assigned the highest available logical address on the data bus. Accordingly, when the circuit pack having the next lower logical address sees a circuit pack having a logical address lower than itself (the address checking process cycling to the beginning of the address register once the highest address is reached), it recognizes that the circuit pack having bus master functionality has either been removed from the data bus or has otherwise become inoperative.

Once the loss of the bus master circuit pack is recognized, the next lowest circuit pack capable of acting as bus master assumes the role of bus master. In addition, that new circuit pack assumes the highest available logical address on the data bus.

An example of a data bus contemplated according to the present invention and discussed in detail below is a logical ring, especially a token passing ring. However, other known bus configurations are operable in accordance with the present invention, although other factors (e.g., processor demands) may be affected.

In a particular configuration of the present invention, disclosed herein by way of example, the data bus used is a token passing ring using the conventionally known ARCNet protocol.

An arrangement in which the circuit pack providing bus master functionality is arbitrarily assigned the lowest logical address on the data bus is also contemplated in accordance with the present invention. In this situation, each of the circuit packs checks the logical address of its logically next lower neighbor. Therefore, when the logically next higher circuit pack to the circuit pack providing bus master functionality detects a circuit pack having a logical address higher than itself, the data bus recognizes that the circuit pack that had been providing bus master functionality has been removed or has otherwise become inoperative. Therefore, the logically next highest circuit pack capable of acting as bus master promotes itself so as to actively function as the bus master.

BRIEF DESCRIPTION OF THE DRAWINGS

The present invention will be described hereinbelow with reference to the drawings appended hereto, in which:

FIG. 3 is a schematic illustration of address partitioning in an example of a data bus according to the present invention;

FIG. 4 is a flow chart illustrating the dynamic reconfiguration of data bus control according to one embodiment of the present invention;

FIG. 5 is a flow chart illustrating the dynamic reconfiguration of data bus control according to another embodiment of the present invention; and FIG. 6 is a flow chart illustrating a system configuration process by which hardware components connected to a data bus determine their respective logical addresses on the data bus.

DETAILED DESCRIPTION OF THE INVENTION

Figure 1:
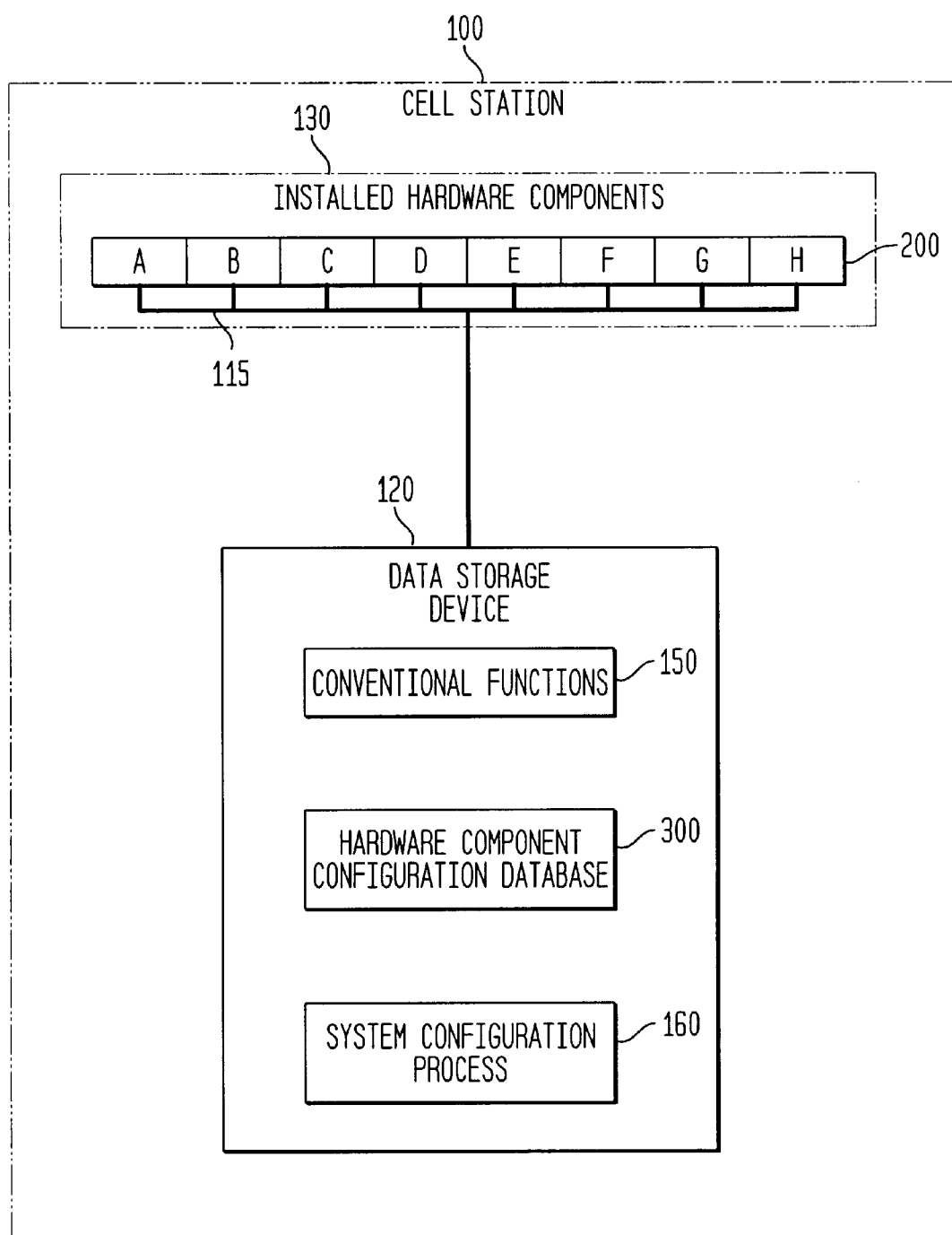
FIG. 1 is a block diagram schematically illustrating the architecture within a cell station.

FIG. 1 illustrates the general architecture of a cell station 100 in a cellular telephone system. Generally, a plurality of hardware devices 200A–200H communicate on a data bus 115 to various higher order devices, such as a CPU (not shown here) or a data storage device 120, which may, for example, include controlling software 150 for conventional cellular communication functionality, stored information 300 regarding hardware device configuration for the respective devices 200A–200H, and various system configuration processes 160.

In a cell station, the devices 200A–200H may include various devices conventionally used in connection with cellular telephone communication, including, without limitation, controllers, radios, clock boards, and amplifiers. Other devices may comprise known test equipment, bridge boards, memory storage, and backup controllers.

Each of the devices 200A–200H connected to data bus 115 determines its logical address on the data bus, in accordance with, for example, the method disclosed in co-pending and commonly assigned application Ser. No. 09/198,289 entitled "A Method and Apparatus for Determining an Address Uniquely Identifying a Hardware Component on a Common Bus," as mentioned above.

According to a feature of the invention disclosed in application Ser. No. 09/198,289 ("the '289 application"), each hardware component 200A–200H reads an identification value from a backplane (not shown) of the frame 130 that has some physical significance. A backplane is an assembly that provides mechanical and electrical connections to the multiple hardware components 200A–200H. The physical identification value describes the hardware component and how the hardware component is located within the cell station 100.

In one implementation disclosed in the '289 application, the identification value is, by way of example, a 16 bit value, with four bits allocated for identifying the carrier frequency and frame associated with the hardware component; four bits allocated for identifying the sector number (such as α, β, γ) associated with the hardware component; four bits allocated for identifying the unit type of the hardware component, such as a radio, clock board, or an amplifier; and four bits allocated for identifying the unit number of the hardware component. The unit number is used to differentiate those units that match all prior descriptors. For example, the unit number can differentiate between a number of channel coder units that are assigned the same carrier frequency and sector, and have the same unit type.

The identification value for each hardware component 200A–200H may be set, for example, by hardwiring the value into the backplane, manually adjusting one or more dip switches, or a combination of the foregoing. In an alternative embodiment, the 16-bit identification value (or portions thereof) may be programmatically set.

Generally, each hardware component 200 reads only a portion of the 16 bit value from the backplane. For example, the hardware component always knows its own unit type. In other words, the hardware component knows whether it is, for example, a radio, a clock board, or an amplifier. In addition, some hardware components, such as a clock board, are common across all carrier frequencies and sectors in the cell station 100, so such global hardware components do not need to read the carrier frequency and sector fields of the 16 bit value. Rather, in one embodiment, such global hardware components set the carrier frequency and sector fields to zero (0).

According to one feature disclosed in the '289 application, the physical identification information obtained from the backplane is used by the hardware components 200A–200H to derive a bus address that uniquely identifies each hardware component 200 on the common bus. When a cell station 100 is powered up, each hardware component 200 reads the corresponding identification value and determines a unique bus address for itself for communicating on the common bus 115.

Upon powering up the cell station 100, the present invention allows each of the hardware components to calculate, for example, a unique 8 bit address from the backplane physical identification information. This calculation is discussed in greater detail below. In this manner, as discussed below, each hardware component can be communicated with uniquely, a map or database of the hardware components located within the cell can be generated, and their interconnection determined. Once the bus addresses for the hardware component are assigned in accordance with the present invention, the cell station 100 operates normally, such that messages are received from the central control station (not shown) by the hardware components 200A–200H and vice versa, as required.

Figure 2:
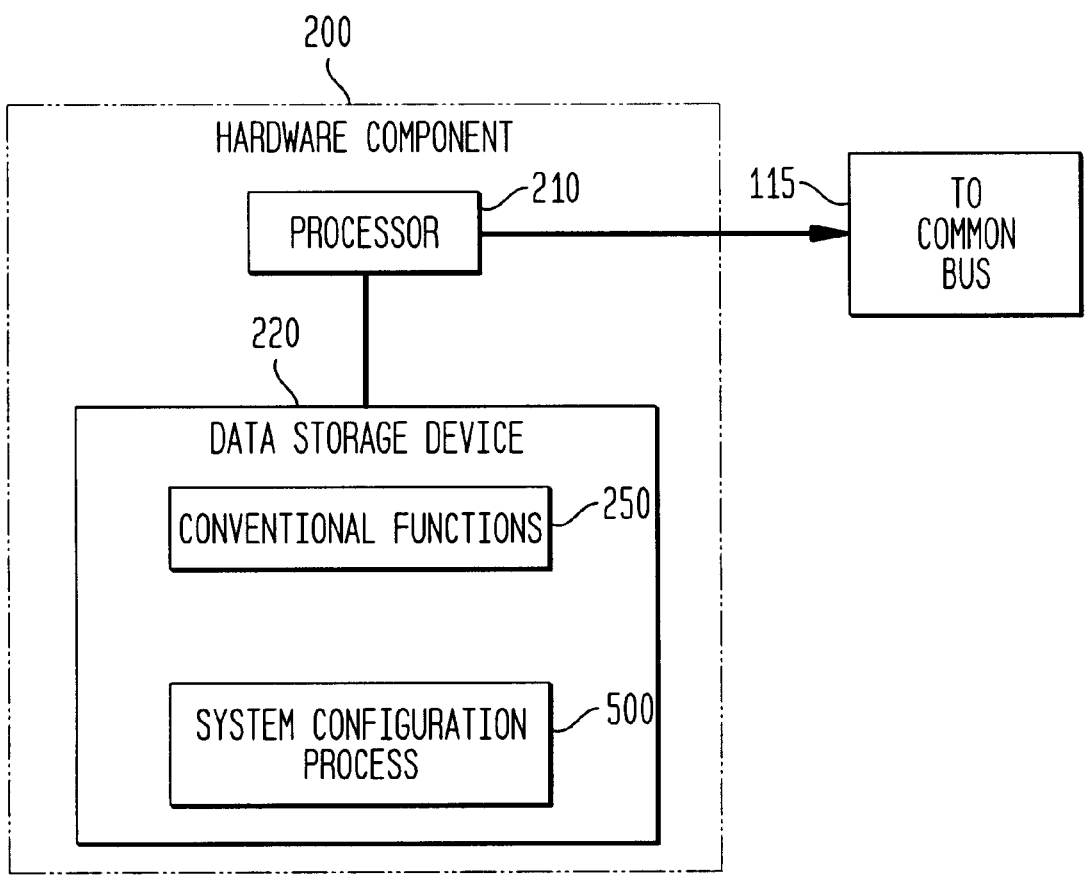
FIG. 2 is a block diagram schematically illustrating a typical hardware component connected to a data bus in the cell station.

FIG. 2 is a block diagram showing the architecture of an illustrative hardware component 200 in accordance with the present invention. As shown in FIG. 2, each hardware component 200 includes a processor 210 and related memory, such as a data storage device 220, which may be distributed or local. The processor 210 may be embodied as a single processor, or a number of local or distributed processors operating in parallel. The data storage device 220 and/or a read only memory (ROM) are operable to store one or more instructions, which the processor 210 is operable to retrieve, interpret and execute.

The data storage device 220 preferably includes the code 250 to perform conventional functions for communicating on the bus. In addition, the data storage device 220 includes a system configuration process 500, discussed below in conjunction with FIG. 6, that reads the corresponding physical identification value from the backplane. Thereafter, the hardware component 200 calculates a unique 8-bit bus address from a subset of the physical identification value to communicate with other hardware components 200A–200H on the common bus 115.

In the illustrative implementation, the bus address space contains 256 addresses (8-bits). The 256 bus address space may be partitioned as shown in FIG. 3. As shown in FIG. 3, address 00 is reserved by the bus hardware as a broadcast address. Thus, messages sent to address 00 can be received by all of the hardware components 200A–200H. The remainder of the bus address space is partitioned into regions dedicated to a specific hardware component type. For example, when a transmit amplifier powers up, the amplifier reads the physical identification information from the backplane to determine its offset from the Tx amplifier base address of 0x2E. Thus, the amplifier processes the following equation:

$$\text{address}_{TxAmp} = 0x2E + sssnn,$$

where sssnn is a binary number consisting of the three least significant bits, sss, of the sector field of the physical identification information and the two least significant bits, nn, of the unit number field of the physical identification information. Since 3 sector bits, sss, provides 8 levels and 2 unit number bits, nn, provides 4 levels, these hardware component-specific rules for determining the 8-bit address are based on assumptions that no more then eight (8) sectors or four (4) amplifiers per sector, are required for any bus. It is noted that much of the address space shown in FIG. 3 is reserved for future growth or new hardware component types. It is further noted that additional partitioning schemes for the available bus address space and hardware component-specific rules for determining the 8-bit address can be used in accordance with the present invention, as would be apparent to a person of ordinary skill in the art. In addition, the present invention allows a hardware component that wants to communicate with a second hardware component to calculate the bus address of the second hardware component. For example, if an alpha (α) sector radio wants to communicate with an alpha (α) sector amplifier, the alpha (α) sector radio only needs to know the amplifier bus address algorithm, such as the partitioning of the bus address space as shown in FIGS. 3 and 4, to determine the address of the alpha (α) sector amplifier.

As previously indicated, each hardware component 200 implements a system configuration process 500, such as the illustrative process shown in FIG. 6, reads the corresponding physical identification value from the backplane, and derives the 8-bit bus address.

As shown in FIG. 6, the system configuration process 500 is initiated during step 510 upon the powering up of the hardware component 200. Thereafter, the system configuration process 500 reads the physical identifier from the backplane during step 520. As previously indicated, each hardware component 200 generally reads only a portion of the 16-bit value from the backplane, since, for example, each hardware component knows its own unit type.

Thereafter, the hardware component 200 calculates a unique bus address from a subset of the physical identifier value during step 530. The physical information and bus address are optionally conveyed to a controller during step 540. Finally, the hardware component 200 uses the calculated bus address to communicate with other hardware components 200A–200H and the hardware controller on the common bus 115 during step 550.

One or more of the devices 200A–200H have, in addition to their primary functionality, the ability to act as bus master for the data bus 115. This is possible by, for example, providing additional devices or software onto the respective devices. Usually, not all of the devices are provided with the ability to act as bus master, because repeated device failure is not expected. Furthermore, in the example of a cell station, usually only the controllers are provided with bus master capability, as they are the only devices with data lines to higher order devices in the cell station. Accordingly, it may be desirable to have only the controllers check for the logical address of its neighbor in accordance with the present invention, as described in detail below.

Although the present invention is not restricted to a particular data bus configuration, an example of a data bus according to the present invention is an RS-485 2-wire bus, using the conventional ARCNet protocol. This sets up a logical token ring topology, as is known in the art.

In accordance with the present invention as seen in FIG. 4, the one device that initially acts as bus master (e.g., a controller) reconfigures itself to use the highest logical address on the bus (e.g., 255) (step 400). Specifically, as devices on the bus are sequentially initialized, each device checks to see whether it is the highest device present. If so, it assumes the highest logical address on the bus, even if there are devices above it that have not initialized yet. For this reason, once a subsequent device undergoes initialization, it will also check to see whether it is the highest device present, but at that time it will see the initial device which as already assumed the highest logical address.

Thereafter, in accordance with the ARCNet protocol, each device 200 checks the logical address of its logically next highest neighbor (step 402). The device with the token has the sole right to initiate a data transmission sequence. Otherwise, it passes the token to its logical neighbor (e.g., the logically next highest neighbor according to the ARCNet protocol). When the token is passed, the original device listens to ensure that its logical neighbor either initiated a transmission or passed the token. If no activity is sensed, then the original device realizes that its logical neighbor has left the bus or has become otherwise inoperative. From this point, the original device increments the address to which the token was passed (e.g., 128 to 129) and resends the token, looking for a new logical neighbor. If the first increment fails to elicit a response (i.e., either a transmission or a token pass), then the address is again incremented, until a new logical neighbor is detected. Once a new logical neighbor is located, its logical address is stored in the original device's register.

Accordingly, if the first device assigned to have bus master functionality fails, is removed from the bus, or otherwise becomes silent, then its logically next lowest neighboring device will not see the device that had been made bus master, but will instead see the logical address of a device lower than itself (since the device that had initially been made to act as the bus master was assigned the highest available logical address, in accordance with the present invention). When this happens, loss of the originally designated bus master device is recognized (step 404), since the highest available logical address is known to all devices on the bus.

The present invention advantageously can dynamically reconfigure control of data bus 115 by identifying the logically highest device capable of acting as bus master (e.g., another controller) and causing that device to assume the highest available logical address on the data bus and initializing its bus master functionality (step 406) in a known manner.

It will be appreciated that a method that mirrors the abovementioned method can be provided in accordance with the present invention, as illustrated in FIG. 5. Specifically, the device initially made to act as the bus master can be arbitrarily assigned the lowest, instead of the highest available logical address (step 500). Thereafter, the devices on the bus check for the logical address of their logically next lowest neighbor (step 502). Therefore, if the logically next highest neighboring device to the device initially made to act as the bus master detects a device at an address higher than its own, the system realizes that the device initially made to act as the bus master has failed or has otherwise become inoperable (step 504). Therefore, the logically lowest device that can act as bus master assumes the role of bus master, including assuming the logically lowest available address on the bus (step 505), in a manner similar to the method illustrated in FIG. 4.

Thus, while there have been shown and described and pointed out fundamental novel features on the invention as applied to preferred embodiments thereof, it will be understood that various omissions and substitutions and changes in the form and details of the devices illustrated, and in their operation, and in the method illustrated and described, may be made by those skilled in the art without departing from the spirit of the invention. For example, it is expressly intended that all combinations of those elements and/or methods steps which perform substantially the same function in substantially the same way to achieve the same results are within the scope of the invention. It is the invention, therefore, to be limited only as indicated by the scope of the claims appended hereto.

What is claimed is:

1. A method for dynamically controlling which device among a plurality of devices connected to a data bus at a respective logical address acts as a bus master, comprising:

making the device with highest available logical address on the data bus the bus master device;

periodically having each device identify the logical address of its logically next highest neighboring device;

recognizing that the bus master device is inoperative when the logically next lower neighboring device to the bus master device sees a device having a lower logical address than the logically next lower neighboring device to the bus master device; and having the logically next lower neighboring device to the bus master device assume the role of bus master.

2. The method according to claim 1, wherein the plurality of devices comprises controllers, radios, clock boards, and amplifiers.

3. The method according to claim 2, wherein only the controllers are able to be promoted to act as a bus master device.

4. The method according to claim 1, wherein the data bus is a logical ring.

5. The method according to claim 4, wherein the data bus is a token ring.

6. The method according to claim 1, wherein having the logically next lower neighboring device assume the role of bus master device includes having the new bus master device assume the highest available logical address on the data bus.

7. The method according to claim 5, wherein the ring data bus uses the ARCNet protocol.

8. A method for dynamically controlling which device among a plurality of devices connected to a data bus at a respective logical address acts as a bus master, comprising:

making the device with lowest available logical address on the data bus the bus master device;

periodically having each device identify the logical address of its logically next lower neighboring device;

recognizing that the bus master device is inoperative when the logically next higher neighboring device to the bus master device sees a device having a higher logical address than the logically next higher neighboring device to the bus master device; and having the logically next higher neighboring device to the bus master device assume the role of bus master.

9. The method according to claim 8, wherein having the logically next higher neighboring device to the bus master device assume the role of bus master includes having the logically next higher neighboring device to the bus master device assume the lowest available logical address on the data bus.

10. The method according to claim 8, wherein the data bus is a logical ring.

11. The method according to claim 10, wherein the data bus is a token ring.

12. In a data bus having a plurality of devices connected thereto, where one of the plurality of devices located at the highest available logical address on the bus acts as the bus master, a method for reconfiguring the data bus upon failure of the device acting as the bus master, comprising:

recognizing that the device acting as the bus master is inoperative based upon the logical address of another device, and having one of the other devices connected to the data bus assume the role of bus master.

13. The method according to claim 12, wherein recognizing that the device acting as the bus master is inoperative comprises:

having each device identify the logical address of its logically next highest neighboring device; and recognizing that the device acting as the bus master is inoperative if the logically next lowest neighboring device to the device acting as bus master identifies a logical address lower than its own logical address.

14. The method according to claim 12, wherein having one of the other devices connected to the data bus assume the role of bus master comprises having the logically next lower neighboring device to the device originally acting as bus master assume the role of bus master.

15. The method according to claim 14, wherein only a subset of the devices connected to the data bus is available to assume the role of bus master, wherein having one of the other devices connected to the data bus assume the role of bus master comprises having the logically next lower neighboring device to the device originally acting as bus master and included in the subset of available devices assume the role of bus master.

16. The method according to claim 12, wherein the plurality of devices comprises controllers, radios, clock boards, and amplifiers.

17. The method according to claim 15, wherein the plurality of devices comprises controllers, radios, clock boards, and amplifiers, and the subset of available devices consists of controllers.

18. The method according to claim 12, wherein the data bus is a logical ring.

19. The method according to claim 18, wherein the data bus is a token ring.

20. The method according to claim 19, wherein the token ring uses the ARCNet protocol.

21. In a cell station comprising controllers, radios, clock boards, and amplifiers connected to a data bus, a method for dynamically reconfiguring control of the data bus, comprising:

making one of the controllers act as a bus master;

recognizing if the one controller becomes inoperative based upon a logical address of a neighboring controller; and having one of the other controllers assume the role as bus master.

22. The method according to claim 21, wherein having one of the other controllers assume the role of bus master comprises having that controller assume the highest available logical address on the data bus.

23. The method according to claim 21, wherein recognizing if the one controller becomes inoperative comprises:

having each of the controllers, radios, clock boards, and amplifiers identify the logical address of its logically next highest neighbor, wherein if the logically next lower controller, radio, clock board, or amplifier to the one controller acting as bus master identifies a logical address lower than its own, the one controller acting as a bus master is recognized as being inoperative.

24. The method according to claim 21, wherein having one of the remaining controllers assume the role of bus master comprises having the one remaining controller having the highest logical address of the remaining controllers assume the highest available logical address on the data bus.

* * * * *